(12) United States Patent
Schroeder et al.

(10) Patent No.: US 10,949,184 B2
(45) Date of Patent: Mar. 16, 2021

(54) METHOD AND SYSTEM OF APPLICATION DEPLOYMENT ON A MOBILE COMMUNICATION DEVICE

(71) Applicant: TOKN Pty Ltd, Connolly (AU)

(72) Inventors: Clinton Thomas Schroeder, Connolly (AU); Kevin Fritz Venter, Connolly (AU)

(73) Assignee: TOKN Pty Ltd, Connolly (AU)

(*) Notice: Subject to any disclaimer, the term of this patent is extended or adjusted under 35 U.S.C. 154(b) by 339 days.

(21) Appl. No.: 15/776,150

(22) PCT Filed: Nov. 21, 2016

(86) PCT No.: PCT/AU2016/051129
§ 371 (c)(1),
(2) Date: May 15, 2018

(87) PCT Pub. No.: WO2017/083937
PCT Pub. Date: May 26, 2017

(65) Prior Publication Data
US 2020/0257513 A1    Aug. 13, 2020

(30) Foreign Application Priority Data
Nov. 19, 2015   (AU) ................................ 2015904764

(51) Int. Cl.
*H04L 29/06* (2006.01)
*H04L 29/08* (2006.01)
(Continued)

(52) U.S. Cl.
CPC ............ *G06F 8/61* (2013.01); *H04L 63/0428* (2013.01); *H04L 63/168* (2013.01); *H04L 63/18* (2013.01);
(Continued)

(58) Field of Classification Search
CPC ........... H04W 12/0023; H04W 12/001; H04W 12/06; H04W 12/0027; H04W 12/08;
(Continued)

(56) References Cited

U.S. PATENT DOCUMENTS 6,857,067 B2   2/2005  Edelman
7,809,366 B2  10/2010  Rao et al.
(Continued)

FOREIGN PATENT DOCUMENTS

WO   WO-2009/148781 A1   12/2009

OTHER PUBLICATIONS

Liu et al., Research on software security and compatibility test for mobile application, 6 pages. (Year: 2014).*
(Continued)

*Primary Examiner* — Thuy Dao
(74) *Attorney, Agent, or Firm* — Marshall, Gerstein & Borun LLP

(57) ABSTRACT

Some embodiments relate to an application server. The application server may comprise: a communication port to communicate with a client application installed on a mobile communication device, the client application being configured to assist the application server to deploy one or more mobile applications on the mobile communication device; an application database to store multiple records of operational data; and a processor. The processor may be configured to: authenticate the client application with the application server; receive from the client application, via a communications network, operational data indicative of information input to the mobile communication device by a user; and store in the application database the operational data received from the client application. Other embodi-
(Continued)

ments relate to methods carried out on or by the application server and to mobile communication devices configured to perform related methods.

26 Claims, 10 Drawing Sheets

(51) Int. Cl.
| | | |
|---|---|---|
| *G06F 9/445* | (2018.01) | |
| *H04L 12/24* | (2006.01) | |
| *G06F 8/61* | (2018.01) | |
| *H04W 12/00* | (2021.01) | |
| *H04W 88/02* | (2009.01) | |

(52) U.S. Cl.
CPC ..... *H04W 12/001* (2019.01); *H04W 12/0023* (2019.01); *H04W 88/02* (2013.01)

(58) Field of Classification Search
CPC ..... H04L 67/34; H04L 67/10; H04L 63/0428; H04L 63/168; H04L 63/18; H04L 65/605; G06F 8/61; G06F 3/0482; G06F 3/011; G06Q 30/016; G06Q 30/0641; G06Q 20/322; G06Q 20/36; G06Q 20/3674; G06Q 20/3829; G06Q 20/40
See application file for complete search history.

(56) References Cited

U.S. PATENT DOCUMENTS

| | | | |
|---|---|---|---|
| 8,935,321 B1 | 1/2015 | Sankaranarayanan | |
| 9,183,380 B2 * | 11/2015 | Qureshi | G06F 21/53 |
| 9,536,081 B2 * | 1/2017 | Fiala | H04W 12/06 |
| 9,544,329 B2 * | 1/2017 | Call | H04L 67/42 |
| 2002/0083160 A1 | 6/2002 | Middleton | |
| 2012/0129452 A1 | 5/2012 | Koh et al. | |
| 2012/0271660 A1 * | 10/2012 | Harris | G06Q 20/12 705/4 |
| 2014/0066015 A1 * | 3/2014 | Aissi | G06F 21/57 455/411 |
| 2015/0006328 A1 * | 1/2015 | Yoon | H04W 4/60 705/26.64 |
| 2017/0257216 A1 * | 9/2017 | Perga | G06F 9/54 |

OTHER PUBLICATIONS

Search Report and Written Opinion in International Application No. PCT/AU2016/051129 dated Feb. 28, 2017, 9 pages.

\* cited by examiner

METHOD AND SYSTEM OF APPLICATION DEPLOYMENT ON A MOBILE COMMUNICATION DEVICE

TECHNICAL FIELD

The disclosure relates, generally, to a computer-implemented method and system of application deployment on a mobile communication device. More particularly, the disclosure relates to the use of a client application installed on a mobile communication device for the deployment of one or more related mobile applications.

BACKGROUND

Existing methods and systems for application deployment rely, to a large extent, on the mobile device's operating system to 'translate' the data. As a result, the mobile application and the communication mechanism must be built specifically for a particular operating system, with modifications and different installation requirements being needed for mobile devices with alternate operating systems (such as, for example, Android and iOS).

Another significant drawback of existing methods and systems for application deployment is that the data load is generally quite large between the enterprise system and the mobile device, because, for example, screen layouts for the application are transferred together with the transactional data. A related problem with existing methods and systems for application deployment is that interaction with the application is only possible while there is network connectivity, since the screen layouts for the application are unable to be downloaded to the mobile device. As a result, there is no way to interact with the application and input data during periods of limited or no network connectivity.

In this specification where a document, act or item of knowledge is referred to or discussed, this reference or discussion is not an admission that the document, act or item of knowledge or any combination thereof was at the priority date, publicly available, known to the public, part of the common general knowledge; or known to be relevant to an attempt to solve any problem with which this specification is concerned.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

The present disclosure relates a method as performed by a client application installed on a mobile communication device to deploy one or more mobile applications, the method comprising:
  (a) receiving from an application server one or more mobile applications for installation on a the mobile communication device via the client application;
  (b) storing on the mobile communication device the one or more mobile applications received from the application server;
  (c) receiving from a mobile application installed on the mobile communication device operational data indicative of information input to the mobile communication device by a user;
  (d) storing in an application database on the mobile communication device the operational data received from the mobile application;
  (e) authenticating the client application and/or mobile application with an application server; and
  (f) automatically transmitting to the application server, via a communications network, the operational data received from the mobile application.

In this specification the terms "deploy" and/or "deployment" are to be understood, unless the context clearly indicates otherwise, as meaning delivery of a particular application service to a user via a mobile communication device.

The method may comprise the preliminary steps of:
  requesting from the application server, via the communications network, one or more data reference objects associated with the mobile application; and
  storing in the application database the one or more data reference objects associated with the mobile application.

The one or more data reference objects may be stored in the application database in a hierarchical structure. Furthermore, this hierarchical structure may substantially correspond to a data structure maintained on the application server.

In step (c) of the method, the operational data received from the mobile application may include an identifier linking the operational data to at least one of the data reference objects.

Step (e) of the method described may further comprise:
  sending to the application server, via the communications network, an authentication request associated with the use of the client application and/or mobile application on the mobile communication device; and
  receiving from the application server, via the communications network, an authentication confirmation authorising the use of the client application and/or mobile application on the mobile communication device.

Step (e) and/or step (f) of the method described may further comprise using an indirect communication channel between the client application and/or mobile application and the application server. This indirect communication channel may comprise using an encrypted communication channel (such as, for example, a Secure Socket Layer communication channel) between the client application and/or mobile application and the application server.

The method may also comprise the further steps of:
  receiving from an application server, via a communications network, session data associated with the use of the client application and/or mobile application on the mobile communication device; and
  displaying on a visual interface of the mobile communication device the session data associated with the use of the client application and/or mobile application.

The present disclosure also relates to software that when installed on a mobile communication device causes the mobile communication device to perform the above method. Similarly, the present disclosure also related to an Application Programming Interface that when installed on a mobile communication device as part of a client application causes the mobile communication device to perform the above method.

The present disclosure also relates to a mobile communication device comprising:
  a program memory to store a client application installed on the mobile communication device and one or more mobile applications installed on the mobile communication device;

a first data port to facilitate communication between the client application and the one or more mobile applications;

a second data port to facilitate communication with an application server; and a processor to
(a) receive from the application server one or more mobile applications for installation on the mobile communication device via the client application;
(b) store on the mobile communication device the one or more mobile applications received from the application server;
(c) send from the mobile application to the client application, using the first data port, operational data indicative of information input to the mobile communication device by a user;
(d) store in an application database on the mobile communication device the operational data received from the mobile application;
(e) authenticate the client application and/or mobile application with an application server using the second data port; and
(f) automatically transmit to the application server, using the second data port, the operational data received from the mobile application.

The mobile communication device preferably also comprises a display device and an input device to facilitate user interaction with the client application and the one or more mobile applications.

The present disclosure also relates to a method as performed by a mobile application installed on a mobile communication device, the method comprising:
(a) receiving, via the mobile communication device, operational data indicative of information input to the mobile communication device by a user;
(b) storing in an application database on the mobile communication device the operational data received;
(c) authenticating the mobile application with a client application installed on the mobile communication device, the client application having been used to deploy the mobile application on the mobile communication device; and
(d) transmitting to the client application the operational data indicative of information input to the mobile communication device by a user.

In step (a) of the method, the operational data received may include an identifier linking the operational data to one or more data reference objects associated with the mobile application. The method may further comprise storing the data reference objects with the mobile application when the mobile application was deployed on the mobile communication device using the client application.

Step (c) of the method described above may further comprise:
sending to the client application an authentication request associated with the use of the mobile application on the mobile communication device; and
receiving from the client application an authentication confirmation authorising the use of the mobile application on the mobile communication device.

Step (c) and/or step (d) of the method described may further comprise using an indirect communication channel between the client application and/or mobile application and the application server. This indirect communication channel may comprise using an encrypted communication channel (such as, for example, a Secure Socket Layer communication channel) between the client application and/or mobile application and the application server.

The present disclosure also relates to software that when installed on a mobile communication device causes the mobile communication device to perform the method described immediately above. Similarly, the present disclosure also relates to an Application Programming Interface that when installed on a mobile communication device as part of a mobile application causes the mobile communication device to perform the method described immediately above.

The present disclosure also relates to a method as performed by an application server, the method comprising:
(a) authenticating a client application with the application server;
(b) receiving from the client application, via a communications network, operational data indicative of information input to a mobile communication device by a user, the client application being installed on the mobile communication device and configured to deploy one or more mobile applications; and
(c) storing in an application database the operational data received from the client application.

Step (a) of the method described above may further comprise:
receiving at the application server, via the communications network, an authentication request associated with the use of the client application and/or mobile application on the mobile communication device; and
sending to the mobile communication device, via the communications network, an authentication confirmation authorising the use of the client application and/or mobile application on the mobile communication device.

In step (b) of the method, the operational data received may include an identifier linking the operational data to one or more data reference objects associated with the mobile application.

The present disclosure also relates to software that when installed on a mobile communication device causes the mobile communication device to perform the method described immediately above.

The present disclosure also relates to an application server comprising:
a communication port to communicate with a client application, the client application being configured to deploy one or more mobile applications on a mobile communication device;
an application database to store multiple records of operational data;
a processor to
authenticate the client application with the application server;
receive from the client application, via a communications network, operational data indicative of information input to the mobile communication device by a user, the client application being installed on the mobile communication device; and
store in an application database the operational data received from the client application.

The one or more mobile applications may be deployed on the mobile communication device via and/or to the client application.

Some embodiments relate to a method performed by a client application that has been downloaded from a remote server and installed on a mobile communication device, the client application being configured to assist an application server to deploy one or more mobile applications, the method comprising:

(a) receiving from the application server one or more mobile applications for installation on the mobile communication device via the client application;
(b) storing on the mobile communication device the one or more mobile applications received from the application server;
(c) receiving from a mobile application installed on the mobile communication device operational data indicative of information input to the mobile communication device by a user;
(d) storing in an application database on the mobile communication device the operational data received from the mobile application;
(e) authenticating the client application and/or mobile application with the application server; and
(f) automatically transmitting to the application server, via a communications network, the operational data received from the mobile application.

Some embodiments relate to a method as performed by an application server, the method comprising:
(a) deploying one or more mobile applications to a mobile communication device via a client application installed on the mobile communication device;
(b) authenticating the client application with the application server;
(c) receiving from the client application, via a communications network, operational data indicative of information input to the mobile communication device by a user via the one or more mobile applications, the client application being configured to facilitate the application server to deploy the one or more mobile applications to the mobile communication device; and
(d) storing in an application database the operational data received from the client application.

In the above embodiments, the one or more mobile applications may be deployed to the client application from the application server.

BRIEF DESCRIPTION OF DRAWINGS

Embodiments will now be described with reference to the accompanying drawings. These embodiments are given by way of illustration only and other embodiments are also possible. Consequently, the particularity of the accompanying drawings is not to be understood as superseding the generality of the preceding description. In the drawings.

DESCRIPTION OF EMBODIMENTS

Representative embodiments relate to a computer implemented method and system of application deployment on a mobile communication device.

Figure 1:
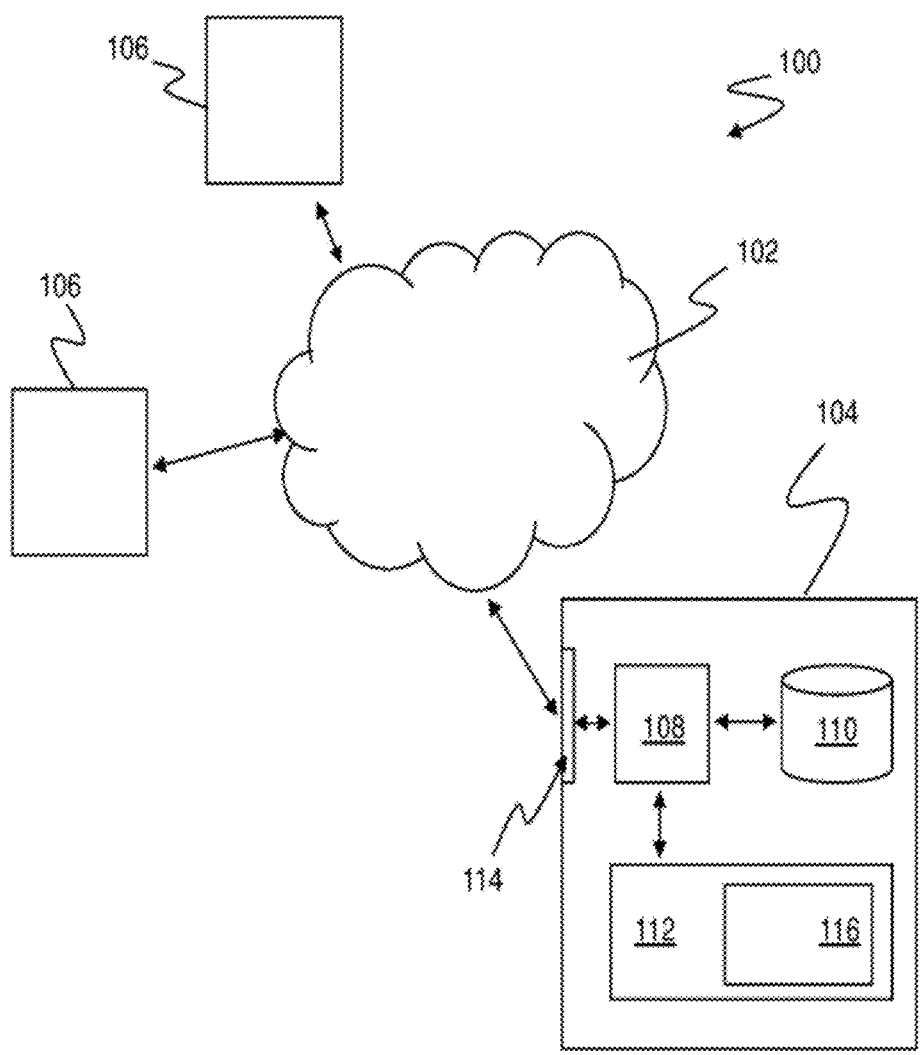
FIG. 1 is a schematic block diagram illustrating a system of application deployment on a mobile communication device in accordance with some representative embodiments.

FIG. 1 is a schematic diagram illustrating a system 100 within which some embodiments may be implemented.

The system 100 uses a communications network 102, e.g. the Internet, to facilitate application deployment on a mobile communication device and specifically, the use of a client application for the deployment of one or more mobile applications on a mobile communication device.

In the exemplary embodiment of system 100, a server 104 executes a web server software application for provision of services to user devices 106. Communication between the server 104 and the devices 106 is thus conveniently based upon standard hypertext transfer protocol (HTTP) and/or secure hypertext transfer protocol (HTTPS).

The devices 106 (i.e. 'clients') may be fixed devices such as desktop computers and/or, preferably, mobile devices such a smart phones, tablets, notebook computers and so forth. As will be appreciated by persons skilled in the communication arts, various mechanisms and technologies are available to provide access to the Internet 102 from fixed and mobile devices 106, and all such technologies fall within the scope of the present disclosure.

The server 104 may generally comprise one or more computers, each of which includes at least one microprocessor 108. The number of computers and processors 108 generally depends upon the required processing capacity of the system, which in turn depends upon the number of concurrent user devices 106 which the system is designed to support. In order to provide a high-degree of scalability, for example when supporting a global user base, the server 104 may utilise cloud-based computing resources, and/or may comprise multiple server sites located in different geographical regions. The use of a cloud computing platform, and/or multiple server sites, enables physical hardware resources to be allocated dynamically in response to service demand. These and other variations, regarding the server computing resources, will be understood to be within the scope of the present disclosure, although for simplicity the exemplary embodiments described herein employ only a single server computer 104 with a single microprocessor 108.

The microprocessor 108 is interfaced to, or otherwise operably associated with, a non-volatile memory/storage device 110. The non-volatile storage 110 may be a hard-disk drive, and/or may include solid-state non-volatile memory such as read-only memory (ROM), flash memory, or the like. The microprocessor 108 is also interfaced to volatile storage 112, such as random access memory (RAM), which contains program instructions and transient data relating to the operation of the server 104.

In a conventional configuration, the storage device 110 maintains known program and data content relevant to the normal operation of the server system 104, including operating systems, programs and data, as well as other executable application software necessary to the intended functions of the server 104. In the embodiment shown, the storage device 110 also contains program instructions which, when executed by the processor 108, enable the server computer 104 to perform operations relating to the implementation of services and facilities embodying the present disclosure, such as are described in greater detail below with reference to FIGS. 3 to 16. In operation, instructions and data held on the storage device 110 are transferred to volatile memory 112 for execution on demand.

The microprocessor 108 is operably associated with a network interface 114 in a conventional manner. The network interface 114 facilitates access to one or more data communications networks, including the Internet 102, to enable communication between the server 104 and the client devices 106. In use, the volatile storage 112 includes a corresponding body of program instructions 116 configured to perform processing and operations embodying features of the present disclosure, for example as described below with reference to FIGS. 4 to 10B.

For example, the program instructions 116 include instructions embodying a web server application. Data stored in the non-volatile 110 and volatile 112 storage comprises web-based code for presentation and/or execution on user devices 106, such as HTML and/or JavaScript code, for facilitating a web-based implementation of a payment transaction service.

Figure 2:
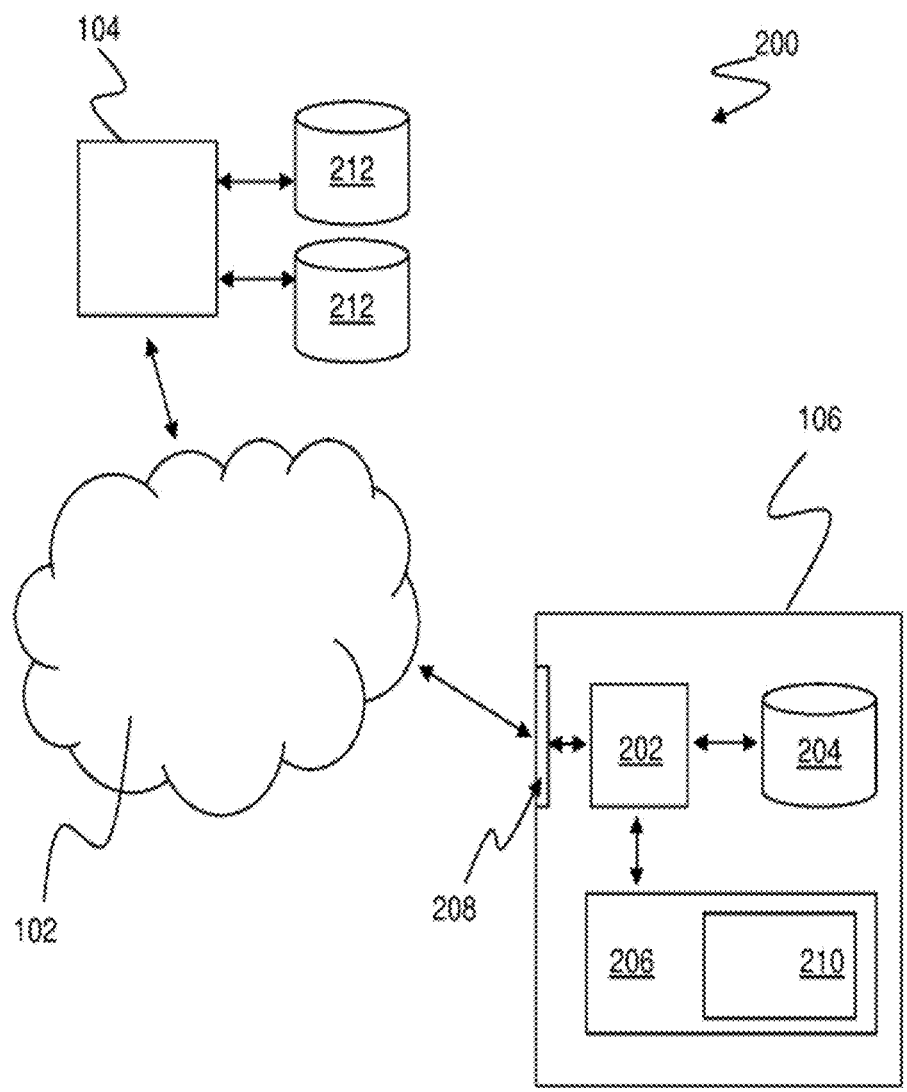
FIG. 2 is a schematic block diagram illustrating a web-based system of application deployment on a mobile communication device in accordance with alternative embodiments.

An alternative implementation 200, again by way of example only, is illustrated in the schematic diagram of FIG. 2. In this alternative embodiment, at least a portion of the executable program code implementing the system is executed within the client devices 106. As shown, each client device is typically a computing device, including at least one microprocessor 202, non-volatile storage 204 and volatile storage 206. Each client device 106 also has a network interface 208, operably associated with the microprocessor 202 in a conventional manner. Accordingly, the client devices 106 are able to conduct computational processing by execution of programs stored locally, in the volatile 206 and non-volatile 204 storage, and/or downloaded via the Internet 102 through the network interface 208.

In the embodiment 200, the server 104 may be in communication with one or more databases 212, which may contain records, for example relating to the operation of a payment transaction service, and additionally may include downloadable software components for execution on the client device 106. For example, a portion of the system may be implemented via program instructions developed in a language such as Java, or some other suitable programming language, which execute on the client device 106 in order to retrieve data via the server 104, and implement some or all of the functionality of the exemplary system of application deployment as described below with reference to FIGS. 4 to 10B.

Client-side implementations may also include downloadable and executable code in the form of browser plugins, such as ActiveX controls for Windows-based browsers, and/or other applets or apps configured for execution within a browser environment or within a smartphone operating system environment, such as an Apple iOS environment or an Android environment.

Various implementations of embodiments of the disclosure will be apparent to persons skilled in the art of software engineering, including various combinations of server-side and client-side executable program components.

Figure 3:
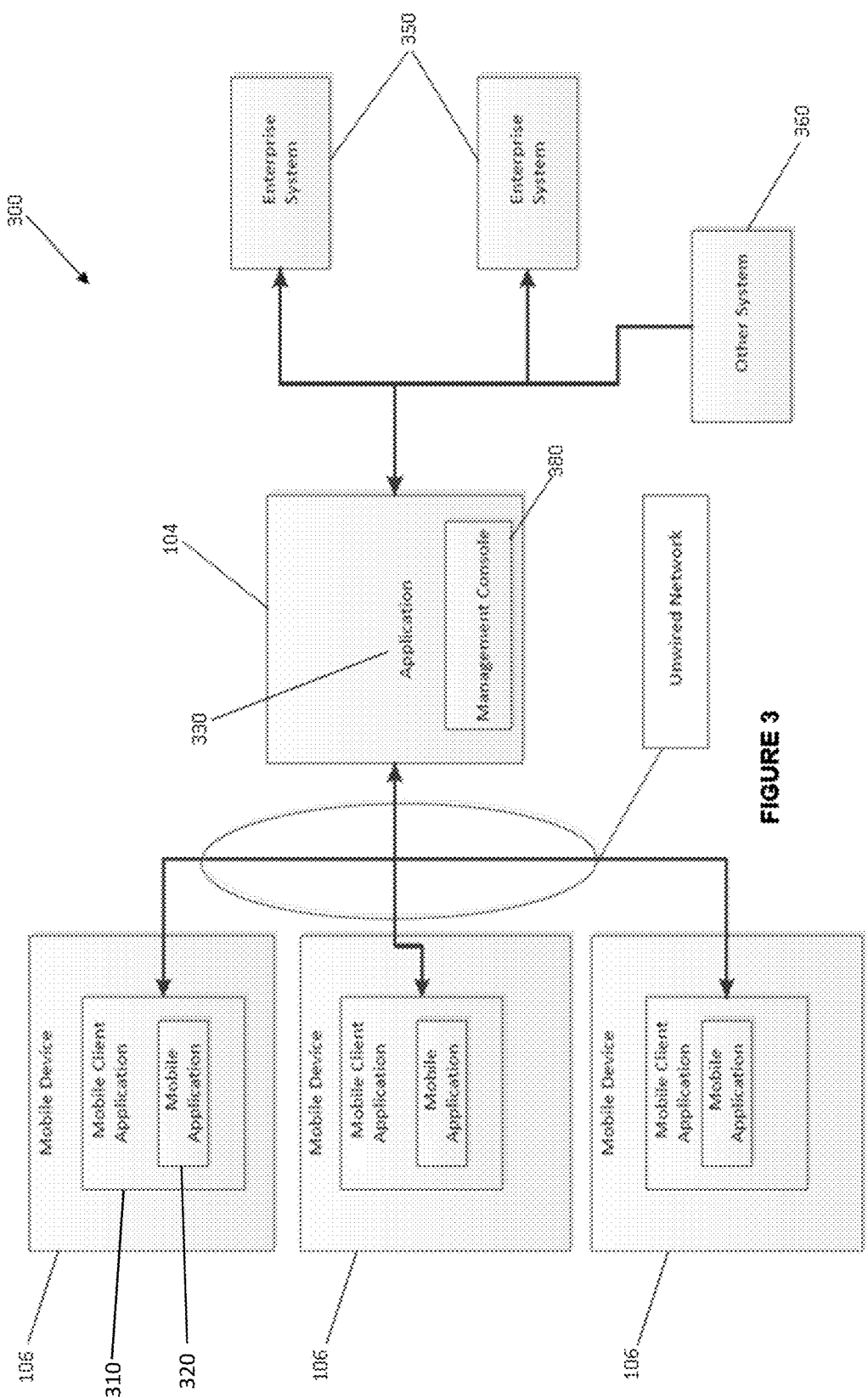
FIG. 3 is a schematic block diagram illustrating a system of application deployment on a mobile communication device in accordance with some embodiments.

FIG. 3 illustrates a preferred embodiment 300 of the system for application deployment on a mobile communication device. In this embodiment 300, the server 104 may be in communication with one or more mobile communication devices 106 via a communication network 102 (such as, for example, a wireless network). Each mobile communication device 106 is preferably installed with a client application 310 that is configured to deploy one or more mobile applications 320 on the mobile communication device 106. Each of the client applications 310 is preferably in connection with a management application 330 installed on an application server 104 via the communications network 102, although it is not necessary that this network connection is constant for operation of the client application 310 (and mobile applications 320) on the mobile communication device 106. In addition, the management application 330 is preferably in communication, via the communications network 102, with one or more enterprise systems 350 and/or other systems 360 to facilitate the sending and receiving of necessary data for operation of the mobile application 320 and/or client application 310.

Figure 4:
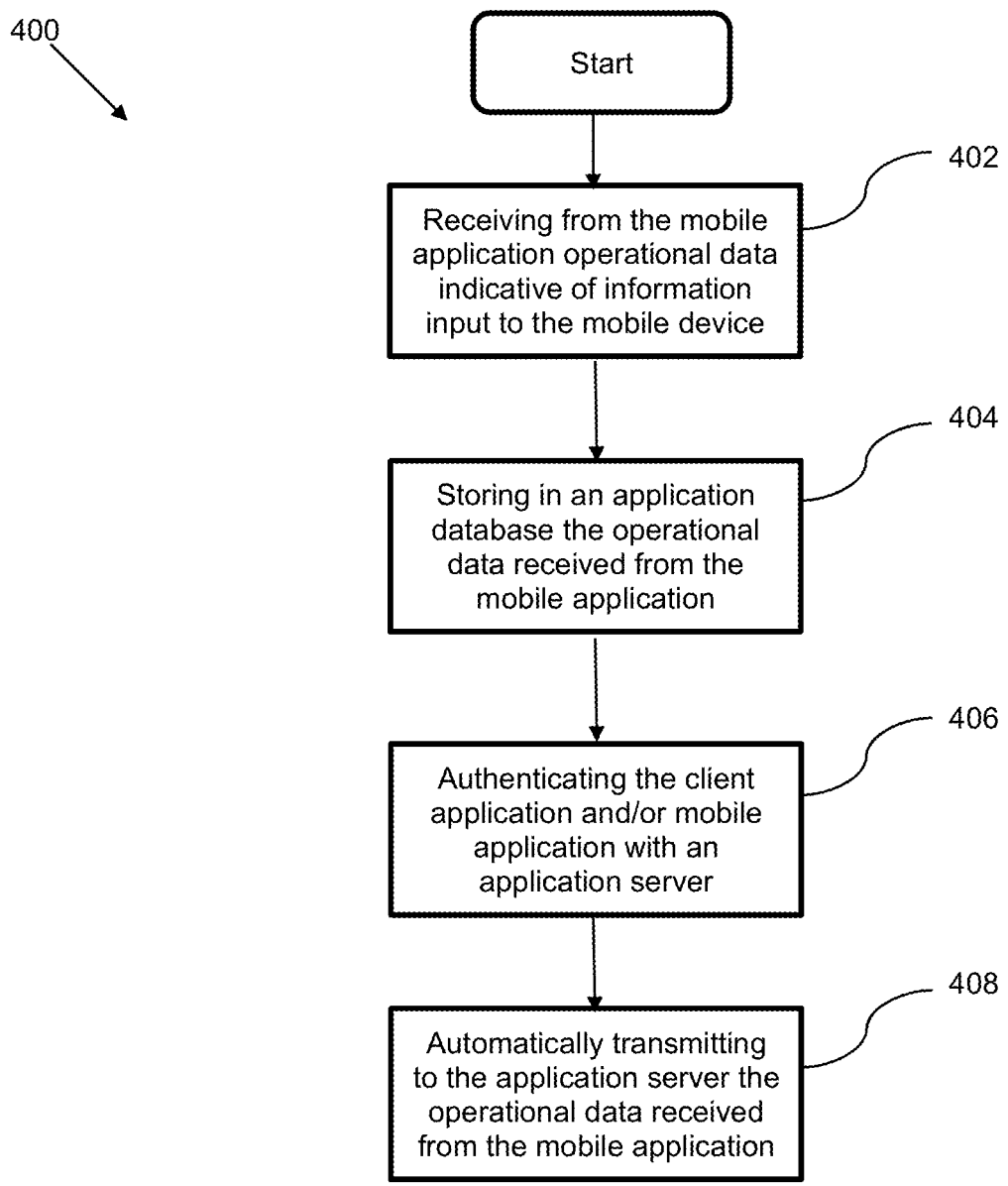
FIG. 4 is a flowchart illustrating an exemplary method as performed by a client application installed on a mobile communication device to deploy one or more mobile applications, in accordance with some embodiments.

Turning now to FIG. 4, there is shown a flowchart which illustrates an exemplary method 400 as performed by a client application 310 installed on a mobile communication device 106 to deploy one or more mobile applications 320 in accordance with the present disclosure. A user will typically have access to a mobile communications device 106 such as, for example, smart phones, tablets, notebook computers and so forth. In accordance with a representative embodiment of the disclosure, such a device 106 will typically be pre-installed with a client application 310 (as will be described in further detail below), which facilitates the deployment of one or more mobile applications 320 on the device 106.

During use of the mobile device 106, the user will often be required to input information to the device via a graphical user interface (GUI) as part of the user's interaction with the mobile application 320. At step 402, the client application 310 is configured to receive from the one or more mobile applications 320 installed on the mobile device 106, operational data indicative of information input (by a user) to the mobile communication device 106. The operational data received from the mobile application 320 preferably includes an identifier linking the operational data to at least one data reference object, which corresponds to a data reference object used in the development of the application database 212. Once received at the client application 310, and at step 404 of the method 400, the operational data is stored in an application database on the mobile communication device 106 in either or both of memory 204, 206. Regardless of whether the mobile communication device 106 has an active network connection, the user may continue to use the mobile application 310 to input operational data.

At step 406 of the method 400, the client application 310 seeks to authenticate the client application 310 and/or one or more of the mobile applications 320 (as will be described in further detail below) with an application server 104. This authentication process firstly requires the client application 310 to send to the (external) application server 104, an authentication request associated with the use of the client application 310 and/or mobile applications 320 on the mobile communication device 106. The user's credentials, with respect to the client application 310 and mobile applications 320 on a particular mobile device, are validated at the application server 104 by accessing stored user and device credentials in the application database 212. Assuming that the user and/or device credentials are valid, the client application 310 receives from the application server 104, via the communications network 102, an authentication confirmation authorising the use of the client application 310 and/or mobile applications 320 on the mobile communication device 106.

At step 408 of the method 400, and upon receiving an authentication confirmation (and provided the device 106 still has an active network connection) the client application 310 automatically transmits to the application server 104, via the communications network 102, the operational data received from the mobile application 320 via the mobile device 106 (e.g. information input by a user on the device 106).

Having regard to steps 406 and 408 of the method 400, the communication between the client application 320 and the application server 104 is preferably conducted using an indirect communication channel between the client application 310 and/or mobile applications 320 and the application server 104. Such an indirect communication channel may include an encrypted communication channel between the client application 310 and/or mobile applications 320 and the application server 104. By way of example, the encrypted communication channel may include the use of a Secure Socket Layer communication channel, although it should be appreciated that other indirect communication channels may also be suitable.

It should also be appreciated (as will be described in further detail below) that the client application 310 can receive from the application server 104 and, more specifically from a management application 330 installed on the server 104, session data associated with the use of the client application 310 and/or mobile applications 320 on the mobile device 106. The session data may be stored in an application database on the mobile communication device 106 in either or both of memory 204, 206, and may also be displayed to a user via a graphical user interface (GUI) as part of the user's interaction with the client application 310 and/or mobile applications 320.

Figure 5:
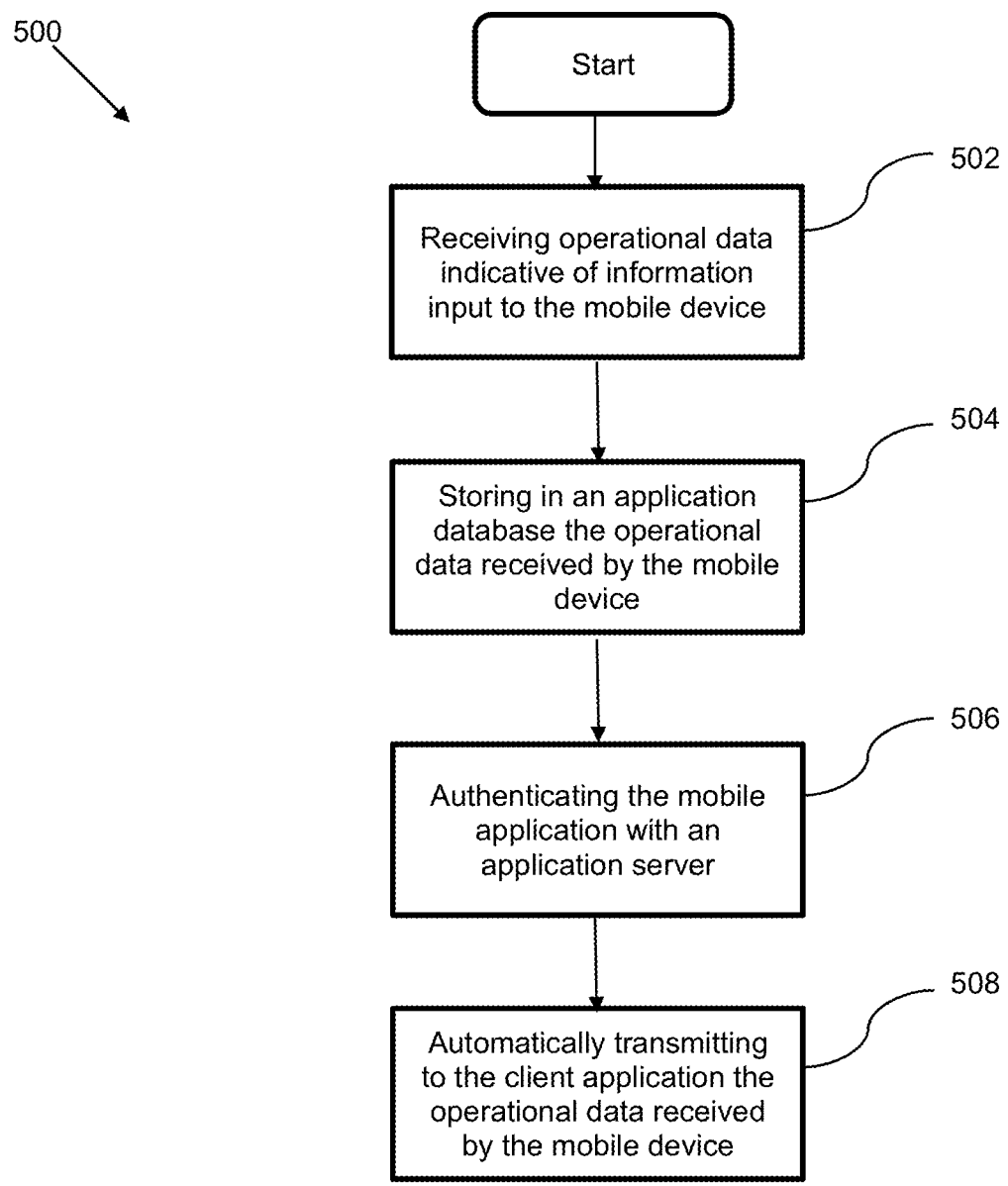
FIG. 5 is a flowchart illustrating an exemplary method as performed by a mobile application installed on a mobile communication device, in accordance with some embodiments.

FIG. 5 is a flowchart illustrating an exemplary method as performed by a mobile application 320 installed on a mobile communication device 106, in accordance with a representative embodiment of the present disclosure.

As described above in relation to the use of the mobile device 106, the user will often be required to input information to the device via a graphical user interface (GUI) as part of the user's interaction with the mobile application 320. At step 502, the mobile application 320 is configured to receive, via the mobile device 106 (i.e. via one or more inputs made available through the mobile device 106), operational data indicative of information input (by a user) to the mobile communication device 106. Once received at the mobile application 320, and at step 504 of the method 500, the operational data is stored in an application database on the mobile communication device 106 in either or both of memory 204, 206. Regardless of whether the mobile communication device 106 has an active network connection, the user may continue to use the mobile application 310 to input operational data.

At step 506 of the method 500, the mobile application 320 seeks to authenticate the mobile application 320 (as will be described in further detail below) with the client application 310. This authentication process firstly requires the mobile application 320 to send to the client application 310, an authentication request associated with the use of the mobile application 320 (via the client application 310 i.e. using the client application 310 as a platform for use of the mobile application) on the mobile communication device 106. The user's credentials, with respect to the mobile application 320 on the particular mobile device, are validated by accessing stored user and device credentials in the application database (on the mobile device 106). Assuming that the user and/or device credentials are valid, the mobile application 320 receives from the client application 310, an authentication confirmation authorising the use of the mobile application 320 on the mobile communication device 106.

At step 508 of the method 500, and upon receiving an authentication confirmation, the mobile application 320 automatically transmits to the client application 310, the operational data received from the mobile application 320 via the mobile device 106 (e.g. information input by a user on the device 106).

It should also be appreciated (as will be described in further detail below) that the mobile application 320 can receive from the client application 310, session data associated with the use of the client application 310 and/or mobile applications 320 on the mobile device 106. This session data may be stored in an application database on the mobile communication device 106 in either or both of memory 204, 206, and may also be displayed to a user via a graphical user interface (GUI) as part of the user's interaction with the mobile applications 320.

Figure 6:
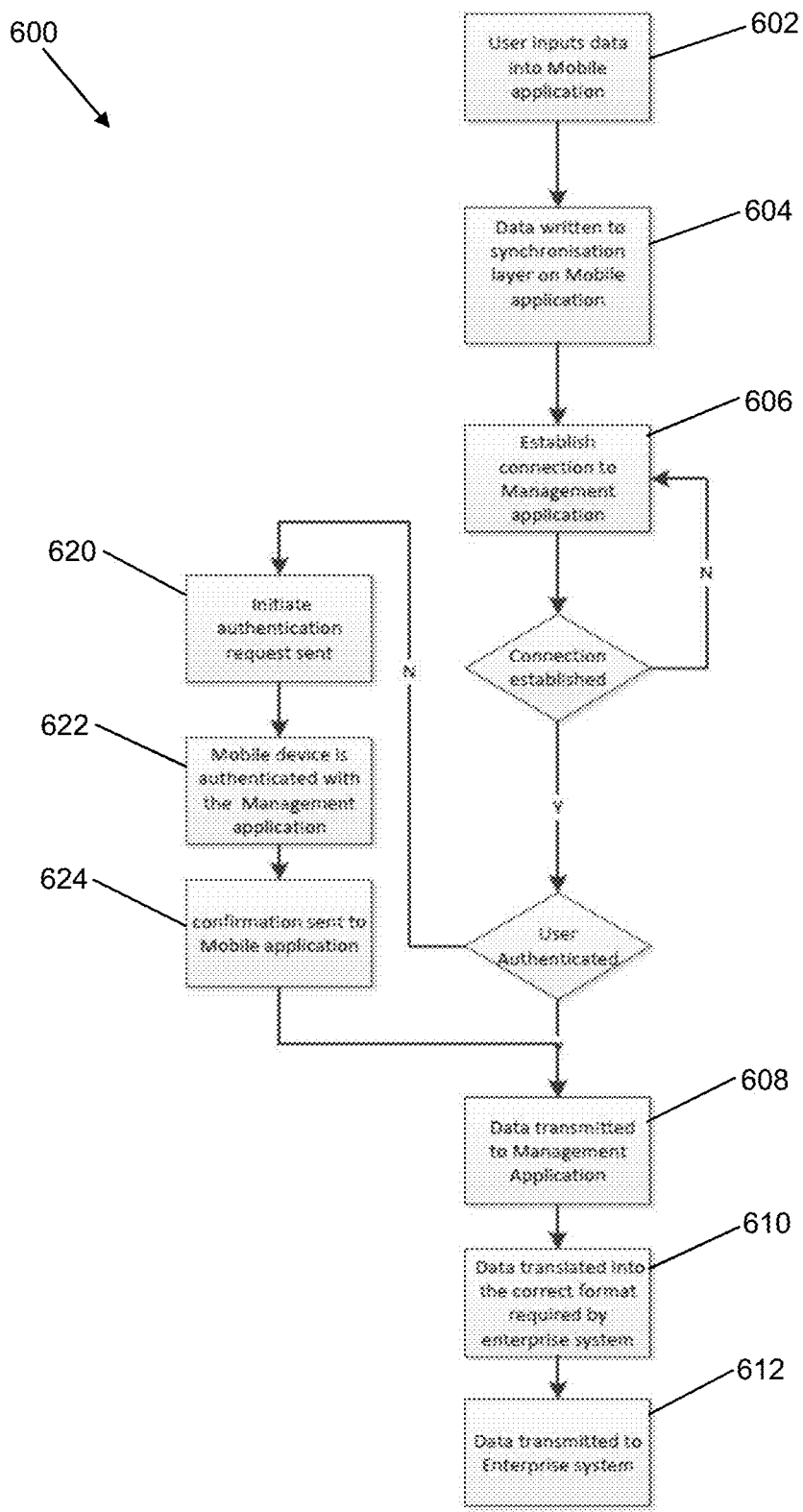
FIG. 6 is a flowchart illustrating an exemplary method of application deployment on a mobile communication device in accordance with some embodiments.

FIG. 6 is a flowchart that illustrates an exemplary method 600 of application deployment on a mobile communication device in accordance with a representative embodiment of the present disclosure. More specifically, the method 600 illustrates the interaction between the client application 310, mobile applications 320, and the management application 330 installed on the application server 104. At step 602 (and as previously described above with respect to step 502), a user may begin to transact with a mobile application 320 by selecting the client application 310 on the graphical user interface (GUI) of the mobile device 106, and navigating to the deployed mobile application 320. For example, in some embodiments, selecting an application icon corresponding to the client application 310 may cause the mobile device display to generate a display of selectable icons for each of the deployed mobile applications 320 that, when selected, cause a user interface for the selected mobile application 320 to be launched to allow the user to interact with the one or more mobile applications 320. In other words, in such embodiments, the mobile applications 320 are not accessible to a user on the mobile device 106 independently of the client application 310. The selected mobile application 320 is configured to receive, via the mobile device 106 (i.e. via one or more inputs made available through the mobile device 106), operational data indicative of information input (by a user) to the mobile communication device 106.

At step 604, and in accordance with a representative embodiment of the disclosure, the user may opt to save the operational data input to the mobile application 320 directly to the mobile device, thereby automatically storing the data on the mobile device 106 and simultaneously creating a record in the synchronization layer of the mobile application 320. This can be done remotely while connected to a network 102, although it is important to note that this network connectivity is not required to perform this function of saving data to the mobile device 106. This has the advantage of allowing the user to work, and input further operational data, while the mobile device 106 is not connected to a network.

At step 606, and as soon as a network connection is available to the mobile device 106, the client application 310 will immediately attempt to utilize the network 102 to connect to the management application 330 installed on the application server 104. If no connection is possible, the operational data will remain on the client application 310 as a synchronization record and when a network connection is available, this process will be attempted again automatically.

If a connection to the application server 104 is successful, at step 620 of the method 600, the client application 310 will attempt to authenticate with the management application 330 installed on the application server 104 by initiating an authentication request. Assuming that the user and/or device credentials are valid (by accessing stored user and device credentials in the application database), the mobile device 106 will at step 622 of the method 600, be authenticated with the management application 330 installed on the application server 104. At step 624, the client application 310 receives from the application server 104, via the communications network 102, an authentication confirmation (e.g. a confirmation message) authorising the use of the client application 310 and/or mobile applications 320 on the mobile communication device 106.

Once the mobile device 106, and mobile application 320, have been authenticated with the application server 104, the management application 330 on the application server 104 may, as an intermediary step initiate a request to the client application 310 to check whether any pending updates need to be transmitted. Following this request, or immediately following step 606 if no updates are required, the client application (at step 608) will then begin to transmit the operational data to the application server 104. Note that only the operational data is transmitted, there is no requirement for any additional forms, containers, user interfaces (UI's), or screens to be returned or loaded to the mobile device 106 in order for this to occur. This has the advantage of vastly reducing the amount of data being transmitted, and vastly improving the speed at which data can transmitted between the client application 310 and the application server 104.

As the operational data is transmitted to the application server 104, at step 610 of the method 600 the operational data is subsequently translated into a format required by one or more enterprise systems 350. In general terms, translation of the operational data involves reformatting the sequence of the data to ensure that it is in the correct sequence required by the enterprise system 350 or other system 360. In other words, it involves conversion of the operational data from one format to another (such as, for example, from a numeric format to a string format) so that the translated operational data is accepted by the target system 350, 360. Finally, at step 612 of the method 600, the management application 330 installed on the application server 104 will then, using the user and/or device credentials already stored in the application database 212 on or accessible to the application server, begin to forward the translated operational data to the one or more enterprise systems 350 in the required format. Again there are no additional forms, screens UI's or containers required to be transmitted for this process to occur. This has the advantage of only the trusted management application 330 can securely connect to the one or more enterprise systems 350, thereby improving the security of the data transfer.

Since the one or more mobile applications 320 are deployed into and accessed through the client application 310, communication between the client application 310 and the one or more mobile applications 320 can be done by logical/software (rather than hardware) data ports established for such communication. For example, such data ports may be provided effectively by making function calls or service calls between the two applications 310/320 while running simultaneously on the mobile device 106. Additionally, the client device 310 and application server 330 may effectively employ logical/software data ports to communicate with each other in a similar way over a network, while also employing any necessary hardware ports between the mobile device 106 and the network infrastructure or hardware of application server 330.

Figure 7:
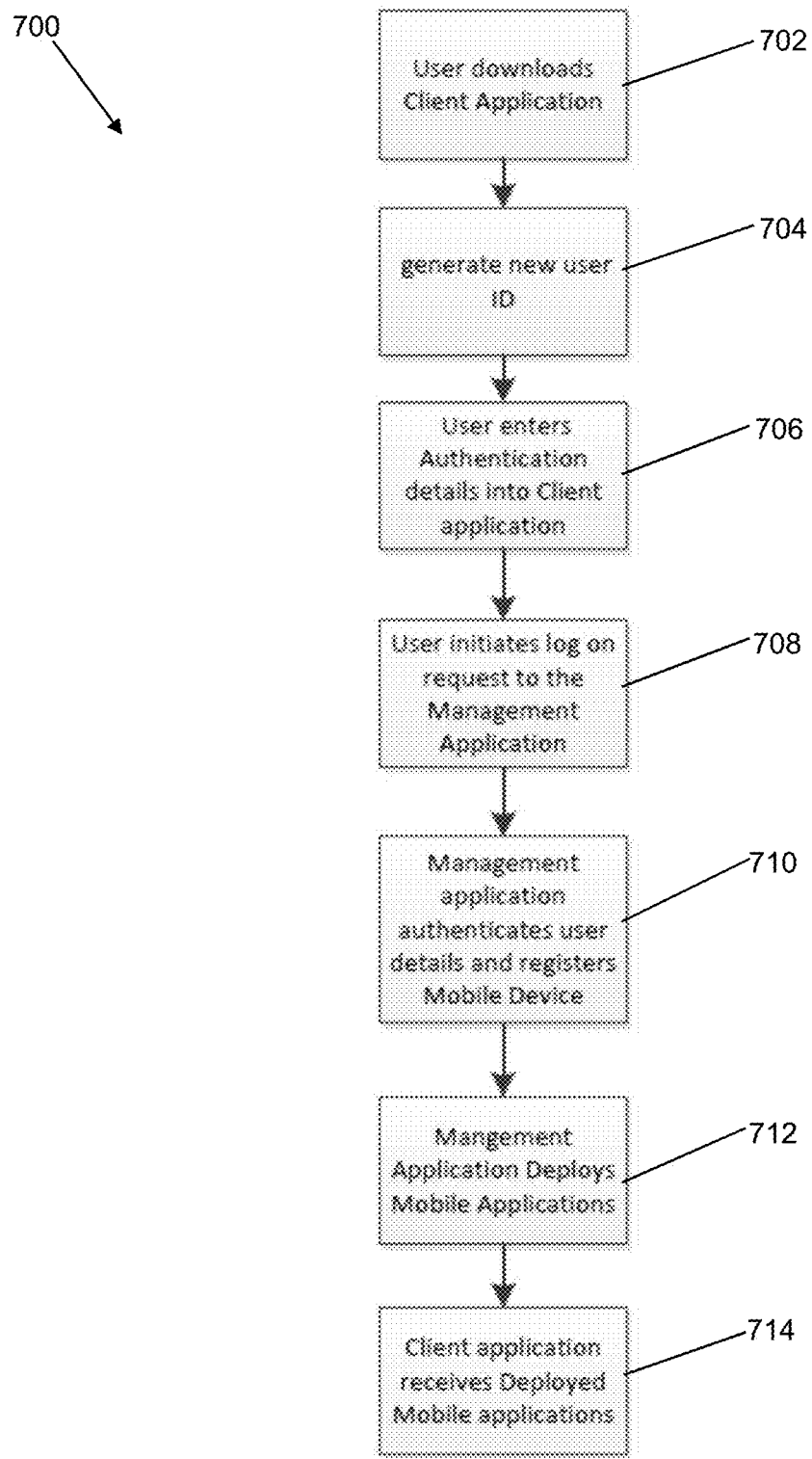
FIG. 7 is a flowchart illustrating an exemplary method of installing and authenticating a client application on a mobile communication device in accordance with some embodiments.

FIG. 7 is a flowchart that illustrates an exemplary method 700 of installing and authenticating a client application 310 on a mobile communication device 106 in accordance with a representative embodiment of the present disclosure. At step 702, and in order for a user to transact with the management application 330 installed on the application server 104, the client application 310 must be downloaded by a user from a remote server and installed on the mobile device 106. The remote server from which the client application 310 is downloaded is different from the application server 104 from which the one or more mobile applications 320 are downloaded. Once installed on the mobile device 106, the client application 310 functions as a work area on the mobile device 106, and provides a platform for the deployment of mobile applications 320. The client application 310 appears on the mobile device 106 much like any application. Preferably, it can be downloaded from any mobile application provider, although in a preferred embodiment, the client application 310 may be downloaded from a remote server such as the Apple store, Google Play store, Windows store or the like. The client application 310 works by providing a specific framework within which the created mobile applications can be deployed and can function. This framework provides all the required functionality needed to interpret menu navigation, screen layouts, associated data storage and transmission as well as the interface to mobile device 106 functionality, which is required.

At step 704, and before a user to connect to the management application 330 installed on the application server 104, a new user identification must be generated. A system administrator or key user must manually issue these newly-created user identification credentials to the mobile user. Without these credentials, the client application 310 cannot connect to the management application 330 installed on the application server 104. The management application 330 may also be used to change and remove a user identification, or modify a user's credentials, at any point in time.

Once the client application 310 has been successfully installed on the mobile device 106 (e.g. a PDA, smartphone or tablet), at step 706 the user is required to manually enter user authentication details for the management application 330 into the client application 310. This action is preferably performed only once upon the initial connection to the management application. Thereafter, the client application 310 will use the stored credential to automatically connect to the management application 330 each and every time a mobile application 320 is opened or initiated. Any deployed mobile applications 320, which communicate with another system 360 via the management application 330, will need credentials to be maintained on the mobile device 106 in the same fashion as the credentials maintained to access the management application 330. This has the advantage of limiting the required log on steps the user must complete in order to connect to the enterprise system 350. These credentials are communicated to the management application 330 once per session and the data is not stored on the management application 330. It exists only as long as the session exists and once disconnected, this data is destroyed from the memory 110, 112. It should also be appreciated that the system may facilitate authenticated access to a corporate network and for that authentication to be propagated to enterprise systems 350 (or other systems 360) using, for example, authentication tickets such as Kerberos.

At step 708, and once a new user has entered the authentication details in the client application 310, they initiate a log on request with the management application 330. This request can be made across a wireless network and is a secure encrypted connection. Once a connection is established, at step 710 the client application 310 will authenticate the new user with the management application 330 installed on the application server 104 (although it should be appreciated that the authentication could be passed off to a separate system such as, for example, an active directory system). When this happens, the new mobile device 106 identification is registered with the management application 330 together with the user identification and the enterprise system 350 user identification. This method 700 allows for the system to manage the security of its own environment, and removes the threat of direct access, by the mobile device 106, to the Enterprise system 350. It also has the advantage of removing the need for direct access to the corporate network and allows a far more secure means of transacting. As a result, the system administrator is able to centrally and securely manage all devices 106 which utilize the client application 310.

Following the authentication of the device 106, the management application 330 is then able to exercise control over the client application 310 and is able to request detailed information about the vital statistics of the device 106, which may include GPS location coordinates and current battery level. Mobile devices 106, once registered with the management application can, for example, be set to be blocked, in which case the client application 310 is prevented from making a connection by the management application 330. This is particularly useful in the event that specific devices 106 need to be prevented from accessing any systems (e.g. enterprise systems 350 or other systems 360). Similarly, a mobile device 106 can be set to be remotely wiped, in which case all of the data on (or associated with) the mobile application 320 will be destroyed upon the next connection to the management application 330. The data will be destroyed only in the mobile application 320 and the device 106 will also immediately be set to 'blocked' on the management application 330.

All communications between the client application 310 and the management application is preferably logged for later access and retrieval. Additionally, a record of the amount of data (e.g. byte size) of every communication between the client application 310 and the management application 330 can also be recorded. This has the advantage of being able to monitor how much data is being consumed on a mobile data package over a given period of time for each device 106. Further, the communication between the client application 310 and the management application 330 is, whenever a network connection is available, real time and enabled to be bi-directional. This means that the client application 310 can push operational data to the management application 330 and the management application can also push data, in real time, to the client application 310.

At step 712, and once the authentication described at step 710 is successful, the management application 330 will firstly send a confirmation message to the client application 310 (i.e. confirming that authentication has been successful). Secondly the management application 330 will send any corporate policies that are to be enforced on the mobile device 106 (e.g. a password required on the mobile device 106). This may be restricted by the approach allowed for each mobile device 106 operating system. Once the policies are applied, the management application 330 will check to see if there are any new, or changed mobile applications 320 awaiting deployment to the client application 310. If there are any such mobile application 320, then these applications 320 are then deployed (including downloading) to the client application 310, thereby enabling the user to transact using the newly deployed mobile applications 320. It is important to note that this operation of deploying the mobile applications 320 to the client application 310 can happen remotely.

At step 714, the newly-deployed (downloaded) mobile applications 320 are received by the client application 310 on the mobile device 106, and relevant program data objects (associated with that particular mobile application 320, as will be described in further detail below) are stored locally in either or both of memory 204, 206 for later use. The local storing of the program data objects in the mobile device memory 204, 206 allows offline processing of input data by the relevant mobile applications 320. Every receipt of each (or each part of) one of the mobile applications 320 and the program data objects is confirmed back to the management application 330 by the client application 310 before the next element (i.e. the mobile application or a part thereof or a program data object) is transferred, thereby ensuring that each transmission is concluded before the next transmission begins.

Non-limiting examples of program data objects (also called data reference objects) deployed to the mobile communication device 106 with the one or mobile applications 320 include: HTML code or files, JavaScript code or files, image files and sound files. Program data objects are used to assist the one or more mobile applications 320 to perform their intended functions without requiring interaction with the application server 330. Program data objects are to be contrasted to operational data objects, which primarily relate to content that is input by a user into the one or mobile applications or that is stored in or accessible through the enterprise server system 350. Such content could include, for example, PDF or text documents, technical drawings, maps, annotations or other user-readable content (i.e. not software code or pure data that requires programming skill to understand).

Figure 8:
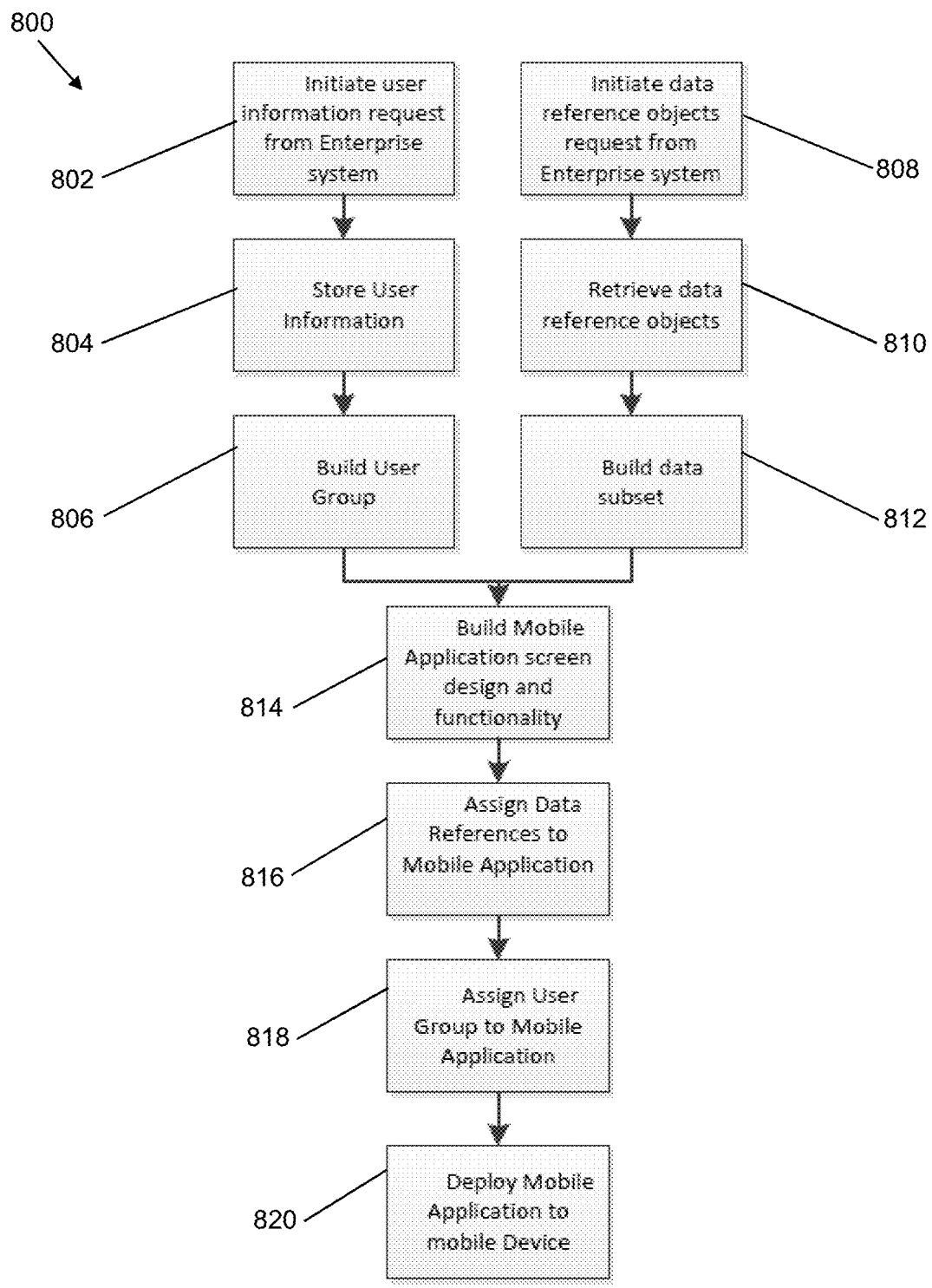
FIG. 8 is a flowchart illustrating an exemplary method of building and deploying a mobile application, via a client application, on a mobile communication device, in accordance with some embodiments.

FIG. 8 is a flowchart that illustrates an exemplary method 800 of building and deploying a mobile application 320, via (or into) a client application 310, on a mobile communication device 106, in accordance with a representative embodiment of the present disclosure. As discussed above in relation to method 700, each user of the system must have valid user credentials to access the management application 330 and they additionally need valid user credentials to access any connected enterprise system 350 or other external system 360. User information may include a user name, initial password, and a validity period for access to the management application 330 and enterprise system 350. At step 802, the method 800 initiates, via the client application, a user information request from the enterprise system 350. The users of the system are created and centrally administered via the management application 330, which allows those users connectivity to the management application 330 installed on the application server 104.

According to a representative embodiment of the present disclosure, the credentials for accessing the target enterprise system 350, for example, are entered once on the mobile application 320 and the mobile application 320 passes that data to the application server 104 every time the user logs in to the management application 330. The management application 330 installed on the application server 104 then passes the credentials on to the enterprise system 350 when transacting. When the client application 310 disconnects from the management application 330, the management application 330 clears the memory for that client application 310 so that the enterprise system 350 credentials are not stored anywhere on the management application 330. This has the advantage of allowing the management application 330 to support mobile application 320 deployment to the target mobile devices 106. It also has the advantage of avoiding any licensing infringement on the connected enterprise system 350. In a representative embodiment of the disclosure, the user information may be automatically interfaced from a user database 212 or other system 360 of record. At step 804, this user information is then stored by the management application 330, preferably within a database 212 or on a memory 110, 112 of the application server 104.

At step 806, the user information can then be used to build a user group. User groups can consist of a single user or a group of users.

In order for the management application 330 to facilitate the translation of data between the client application 310 and the enterprise system 350, a list of data reference objects must be requested from the enterprise system 350 and stored on the management application 330. In accordance with a representative embodiment of the present disclosure, the list of data objects may consist of a list of tables and field references that pertain to the enterprise system 350. At step 808, the management application 330 initiates a request for a list of data objects associated with the mobile application 320 being built.

At step 810 of the method 800, a list of data reference objects is returned by the enterprise system 350 and stored on the management application 330. This means that the data itself is not stored on the management application 330 but that the management application 330 merely acts as a view of the data structure on the enterprise system 350. This allows the management application 330 to later translate the data when received, from the mobile device 106, into the format required by the enterprise system 350. In a representative embodiment of the present disclosure, the reference objects may be stored on the management application 330 in a hierarchical structure that mimics the data structure on the enterprise system 350, from where they may later be managed.

Using the management application 330, and at step 812 of the method 800, only the required data objects need be selected and grouped according to specific, tailored requirements to build data subsets. This has a number of benefits. Firstly, it allows for freedom of the selection of data objects when building the mobile application 320 and secondly, it means that when data is later transferred between the mobile device 106 and the enterprise system 350 only the essential data objects are utilized. This vastly reduces the amount of data that needs to be transferred and increases the speed at which the data transfer occurs.

At step 814, the developer workbench functionality of the management application 330 allows a user to develop mobile applications 320. It is important to note that mobile applications 320 developed using the management application 330 are platform and operating system agnostic and need only be developed once (i.e. there is no need for a developer to recreate the mobile application 320 for use on Apple, Android and Windows operating systems). As is ordinarily the case, mobile applications 320 contain the screen layouts, screen design and functionality necessary for the mobile device 106 user to transact in. The mobile application 320 is built independently of the enterprise system 350, which means that the screen layout, design and behaviour can be vastly improved and simplified allowing for improved transactional capability on a mobile device 106. This also means that, when built, the mobile application 320 is complete and is able to operate in its own capacity remotely. As a result, it does not require any additional forms, screens or software components, or functionality to complete the transaction at the time of transacting, and is self-contained. The mobile application 320 is built once and deployed once to the mobile device 106. Thereafter, only the operational and session data is transferred between the mobile device 106 and the enterprise system 350. In a representative embodiment of the present disclosure, the developer workbench functionality of management application 330 may be utilized to edit, change and extend the functionality in any mobile application 320 at any point via software updates transmitted to the mobile communication device 106 from the application server 104.

During the construction of the mobile application 320, and at step 816 of the method 800, specific data objects might be selected and referenced in the mobile application 320. This allows only the essential and relevant data objects to be made available in the mobile application 320. In a representative embodiment of the present disclosure, this flexibility has the advantage of allowing the mobile application 320 developer the freedom to build the most minimal and streamlined application 320, which adds to the user experience and improves the performance of the mobile application 320.

Once the mobile application 320 has been developed, and at step 818 of the method 800, the management application 330 may be used to associate user groups to a particular mobile application 320. The mobile application 320 can then be specifically rolled out to a target rollout user group.

At step 820 of the method 800, once the mobile application 320 is ready for deployment, it may be registered for deployment on the management application 330. Specific devices 106 can also be registered for deployment of the mobile applications 320 the next time that one of these mobile device 106 establishes a connection with the management application 330. If such a registration is performed (i.e. connection established), the mobile applications 320 will be automatically deployed to the client application 310 as described above in relation to FIG. 7. New applications 320 and modified applications 320 can also be deployed to the mobile device 106 in this way. When such mobile applications 320 are being deployed to the mobile communication device 106, the relevant data objects are also downloaded and stored onto the memory 204, 206 of the mobile communication device 106 at or around the same time.

Figure 9A:
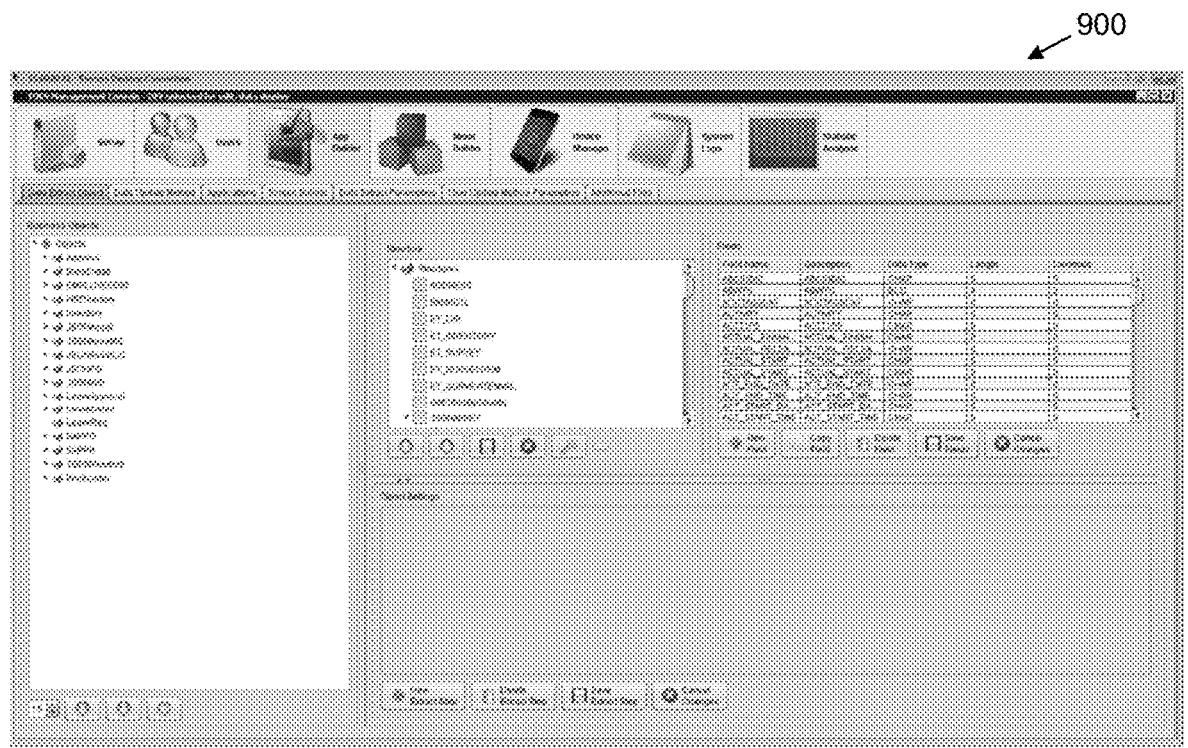
FIGS. 9A to 9D are screenshots illustrating a management console used to build, monitor and deploy mobile applications on the mobile communications device.
Figure 9B:
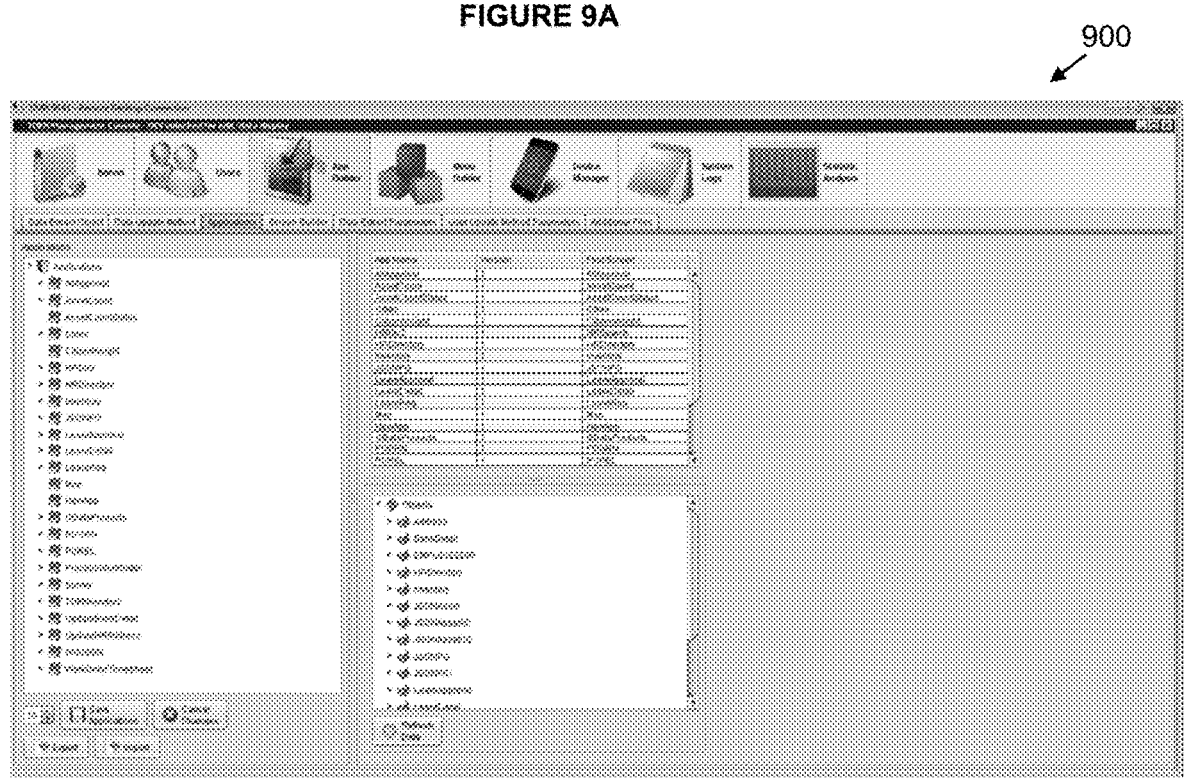
Figure 9C:
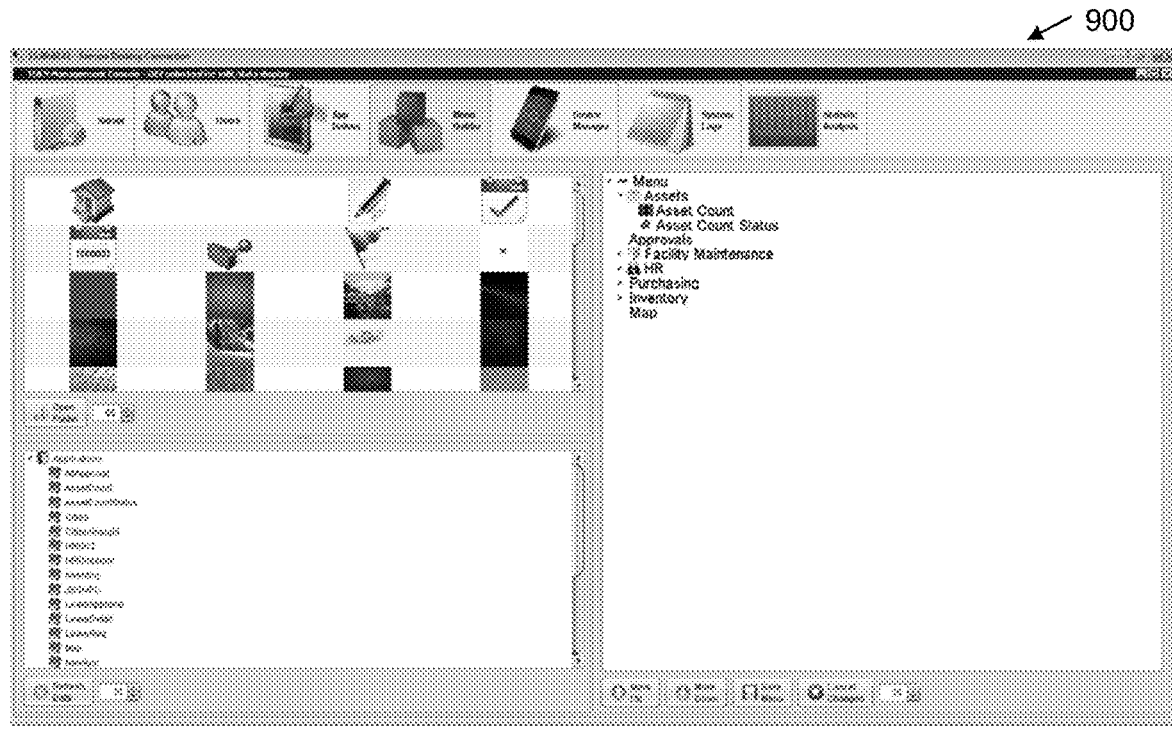
Figure 9D:

FIGS. 9A to 9D are screenshots that illustrate functions of a management console 380 (FIG. 3), which is a software subsystem of the management application 330 used to build, monitor and deploy mobile applications 320 on the mobile communications device 106. More specifically, FIGS. 9A and 9B illustrate screenshots of the application development workbench functionality of the management console 380 which allows an application developer to build new mobile applications 320 for deployment to the client application 310 on a mobile device 106. Similarly, FIG. 9C illustrates a screenshot of the application development workbench functionality of the management console 380 which allows an application developer to select menus for inclusion in the mobile application 320. Finally, FIG. 9D illustrates a screenshot of the device manager functionality of the management console 380, which allows a system administrator to remotely control the use of mobile devices 106 by various users.

As various inventive aspects may be embodied in several forms without departing from the essential characteristics of various embodiments, it should be understood that the above described embodiments should not be considered to limit the present disclosure but rather should be construed broadly. Various modifications, improvements and equivalent arrangements will be readily apparent to those skilled in the art, and are intended to be included within the spirit and scope of the disclosure. The present embodiments are, therefore, to be considered in all respects as illustrative and not restrictive.

The invention claimed is:

1. A method performed by a client application that has been downloaded from a remote server and installed on a mobile communication device, the client application being configured to assist an application server to deploy one or more mobile applications, the method comprising:
   (a) receiving from the application server one or more mobile applications for installation on the mobile communication device via the client application;
   (b) storing on the mobile communication device the one or more mobile applications received from the application server;
   (c) receiving from a mobile application installed on the mobile communication device operational data indicative of information input to the mobile communication device by a user;
   (d) storing in an application database on the mobile communication device the operational data received from the mobile application;
   (e) authenticating the client application and/or mobile application with the application server; and
   (f) automatically transmitting to the application server, via a communications network, the operational data received from the mobile application.

2. The method according to claim 1, wherein the method comprises the preliminary steps of:
   requesting from the application server, via the communications network, one or more data reference objects associated with the mobile application; and
   storing in the application database the one or more data reference objects associated with the mobile application.

3. The method according to claim 2, wherein the one or more data reference objects are stored in the application database in a hierarchical structure.

4. The method according to claim 3, wherein the hierarchical structure substantially corresponds to a data structure maintained on the application server.

5. The method according to claim 3, wherein in step (c) the operational data received from the mobile application includes an identifier linking the operational data to at least one of the data reference objects.

6. The method according to claim 1, wherein step (e) further comprises:
   sending to the application server, via the communications network, an authentication request associated with the use of the client application and/or mobile application on the mobile communication device; and
   receiving from the application server, via the communications network, an authentication confirmation authorising the use of the client application and/or mobile application on the mobile communication device.

7. The method according to claim 1, wherein step (e) and/or step (f) comprise using an indirect communication channel between the client application and/or mobile application and the application server.

8. The method according to claim 7, wherein using the indirect communication channel comprises using an encrypted communication channel between the client application and/or mobile application and the application server.

9. The method according to claim 8, wherein using an encrypted communication channel comprises using a Secure Socket Layer (SSL) communication channel.

10. The method according to claim 1, wherein the method comprises the further steps of:
    receiving from an application server, via a communications network, session data associated with the use of the client application and/or mobile application on the mobile communication device; and
    displaying on a visual interface of the mobile communication device the session data associated with the use of the client application and/or mobile application.

11. The method according to claim 1, wherein steps (a) through (f) are performed using an Application Programming Interface installed on the mobile communication device as part of the client application.

12. The method of claim 1, wherein the one or more mobile applications are deployed to the client application from the application server.

13. A mobile communication device, comprising:
    a program memory storing a client application installed on the mobile communication device and one or more mobile applications installed on the mobile communication device;
    a first data port to facilitate communication between the client application and the one or more mobile applications;
    a second data port to facilitate communication with an application server; and
    a processor to
        (a) receive from the application server one or more mobile applications for installation on the mobile communication device via the client application;
        (b) store on the mobile communication device the one or more mobile applications received from the application server;
        (c) send from the mobile application to the client application, using the first data port, operational data indicative of information input to the mobile communication device by a user;
        (d) store in an application database on the mobile communication device the operational data received from the mobile application;
        (e) authenticate the client application and/or mobile application with the application server using the second data port; and
        (f) automatically transmit to the application server, using the second data port, the operational data received from the mobile application.

14. The mobile communication device of claim 13, further comprising a display device and an input device to facilitate user interaction with the client application and the one or more mobile applications.

15. A method as performed by a mobile application installed on a mobile communication device, the method comprising:
(a) receiving, via the mobile communication device, operational data indicative of information input to the mobile communication device by a user;
(b) storing in an application database on the mobile communication device the operational data received;
(c) authenticating the mobile application with a client application installed on the mobile communication device, the client application having been used to deploy the mobile application on the mobile communication device; and
(d) transmitting to the client application the operational data indicative of information input to the mobile communication device by a user.

16. The method according to claim 15, wherein in step (a) the operational data received includes an identifier linking the operational data to one or more data reference objects associated with the mobile application.

17. The method of claim 16, further comprising storing the data reference objects with the mobile application when the mobile application was deployed on the mobile communication device using the client application.

18. The method according to claim 15, wherein step (c) further comprises:
sending to the client application an authentication request associated with the use of the mobile application on the mobile communication device; and
receiving from the client application an authentication confirmation authorising the use of the mobile application on the mobile communication device.

19. The method according to claim 15, wherein step (c) and/or step (d) comprise using an indirect communication channel between the client application and the mobile application.

20. The method according to claim 19, wherein using the indirect communication channel comprises using an encrypted communication channel between the client application and the mobile application.

21. The method according to claim 20, wherein using an encrypted communication channel comprises using a Secure Socket Layer (SSL) communication channel.

22. The method according to claim 15, wherein steps (a) through (f) are performed using an Application Programming Interface installed on the mobile communication device as part of the mobile application.

23. A method as performed by an application server, the method comprising:
(a) deploying one or more mobile applications to a mobile communication device via a client application installed on the mobile communication device, wherein the client application provides a platform for deployment and use of the one or more mobile applications;
(b) authenticating the client application with the application server;
(c) receiving from the client application, via a communications network, operational data indicative of information input to the mobile communication device by a user via the one or more mobile applications, the client application being configured to facilitate the application server to deploy the one or more mobile applications to the mobile communication device; and
(d) storing in an application database the operational data received from the client application.

24. The method according to claim 23, wherein step (b) further comprises:
receiving at the application server, via the communications network, an authentication request associated with the use of the client application and/or mobile application on the mobile communication device; and
sending to the mobile communication device, via the communications network, an authentication confirmation authorising the use of the client application and/or mobile application on the mobile communication device.

25. The method according to claim 23, wherein in step (c) the operational data received includes an identifier linking the operational data to one or more data reference objects associated with the mobile application.

26. An application server comprising:
a communication port to communicate with a client application installed on a mobile communication device, the client application providing a platform for (i) the application server to deploy one or more mobile applications on the mobile communication device, and (ii) use of the one or more mobile applications on the mobile communication device;
an application database stored in one or more memories to store multiple records of operational data; and
a hardware processor to:
authenticate the client application with the application server;
receive from the client application, via a communications network, operational data indicative of information input to the mobile communication device by a user; and
store in the application database the operational data received from the client application.

* * * * *